(12) United States Patent
Page et al.

(10) Patent No.: US 6,722,889 B1
(45) Date of Patent: Apr. 20, 2004

(54) TRAINING FOOTBALL

(75) Inventors: Chris S. Page, Portland, OR (US); Paul A. Gaudio, Portland, OR (US); Geoffrey Charles Raynak, Lake Oswego, OR (US); Charles D. Kraeuter, Lake Oswego, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 10/186,221

(22) Filed: Jun. 27, 2002

(51) Int. Cl.[7] .................................................. G09B 9/00
(52) U.S. Cl. ...................................... 434/251; 473/438
(58) Field of Search ................................. 434/236, 237, 434/258, 259, 247, 393, 248, 251; 473/438, 597, 596, 451, 598, 599; 446/268, 369, 385

(56) References Cited

U.S. PATENT DOCUMENTS

| | | | |
|---|---|---|---|
| 2,448,731 A | * | 9/1948 | Park |
| 2,925,273 A | * | 2/1960 | Pratt |
| 3,370,851 A | * | 2/1968 | Murray |
| 4,546,975 A | | 10/1985 | Nims |
| 4,772,020 A | | 9/1988 | Martin |
| 4,867,452 A | * | 9/1989 | Finley ........................ 273/65 E |
| 4,887,814 A | | 12/1989 | Winter |
| 4,928,962 A | | 5/1990 | Finley |
| 5,133,550 A | | 7/1992 | Handy |
| 5,195,745 A | * | 3/1993 | Rudell et al. ............ 273/65 EG |
| D335,906 S | | 5/1993 | Hellerman |
| 5,224,704 A | | 7/1993 | Snell |
| D355,230 S | | 2/1995 | Brown |
| 5,407,193 A | * | 4/1995 | McGinley .................. 273/26 R |
| 5,427,372 A | * | 6/1995 | Ratner et al. ............ 273/65 ED |
| 5,570,882 A | | 11/1996 | Horkan |
| D382,927 S | | 8/1997 | McGowen et al. |
| 5,676,611 A | | 10/1997 | Foster et al. |
| 5,807,198 A | | 9/1998 | Grimm |

OTHER PUBLICATIONS

Photograph of "Spalding" ball which was on sale in this country at least one year prior to the filing date of the present application.
Photograph of "Black Bomb" ball which was on sale in this country at least one year prior to the filing date of the present application.
Photograph of "Playoff" ball which was on sale in this country at least one year prior to the filing date of the present application.
Photograph of "Zwirl" ball which was on sale in this country at least one year prior to the filing date of the present application.
Photograph of "Poof" ball which was on sale in this country at least one year prior to the filing date of the present application.
Photograph of "Sunburst" ball which was on sale in this country at least one year prior to the filing date of the present application.
Photograph of "Gripper" ball which was on sale in this country at least one year prior to the filing date of the present application.

* cited by examiner

*Primary Examiner*—Derris H. Banks
*Assistant Examiner*—Jamila Williams
(74) *Attorney, Agent, or Firm*—Banner & Witcoff, Ltd.

(57) ABSTRACT

The invention is training football having a plurality of perceptive elements, including tactile elements and visual elements. The tactile elements are positioned on an outer surface of the football in locations that correspond with locations that contact the hand of an individual when properly throwing a football. Accordingly, the tactile elements provide the individual with tactile information regarding proper hand positioning. The tactile elements may also provide the individual with visual cues regarding proper hand positioning. The visual elements are positioned on end portions of the football that are visible to the individual following a throw of the football, thereby providing the individual with feedback concerning the quality of each football throw.

29 Claims, 6 Drawing Sheets

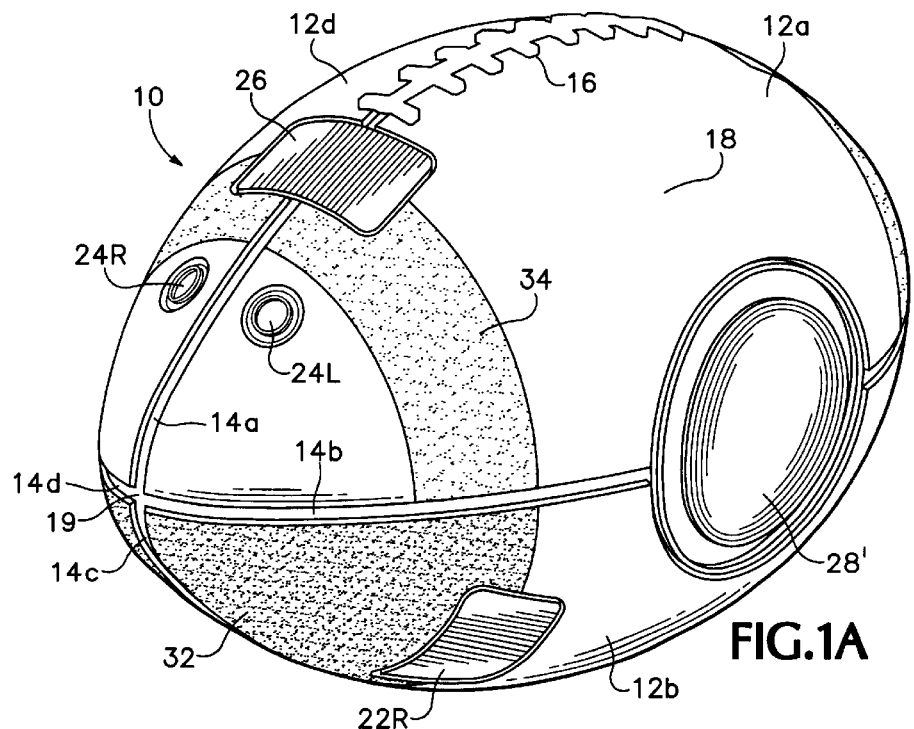
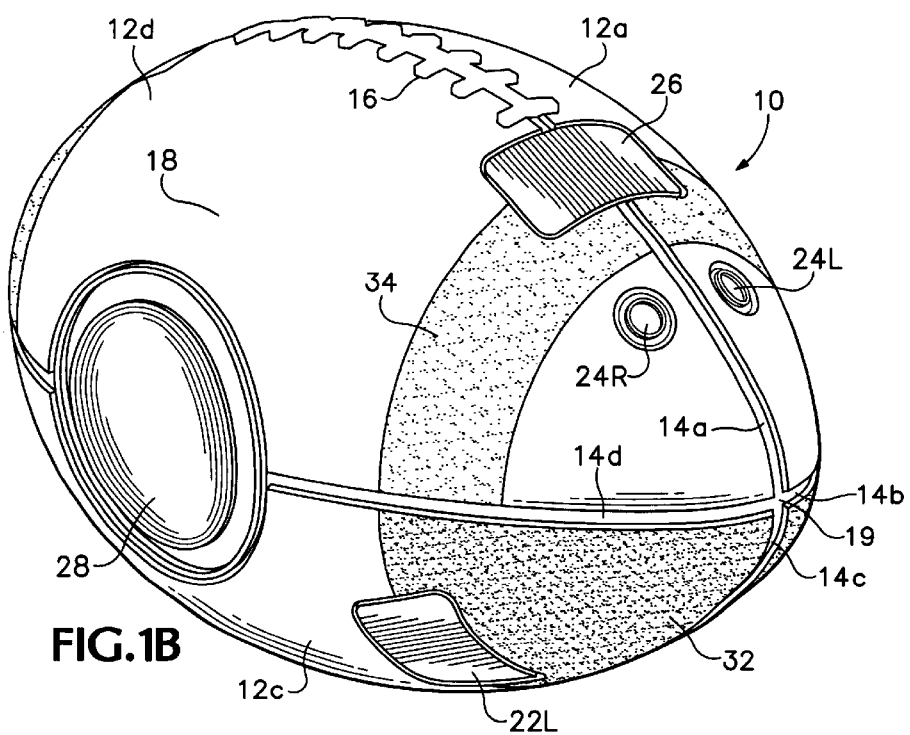

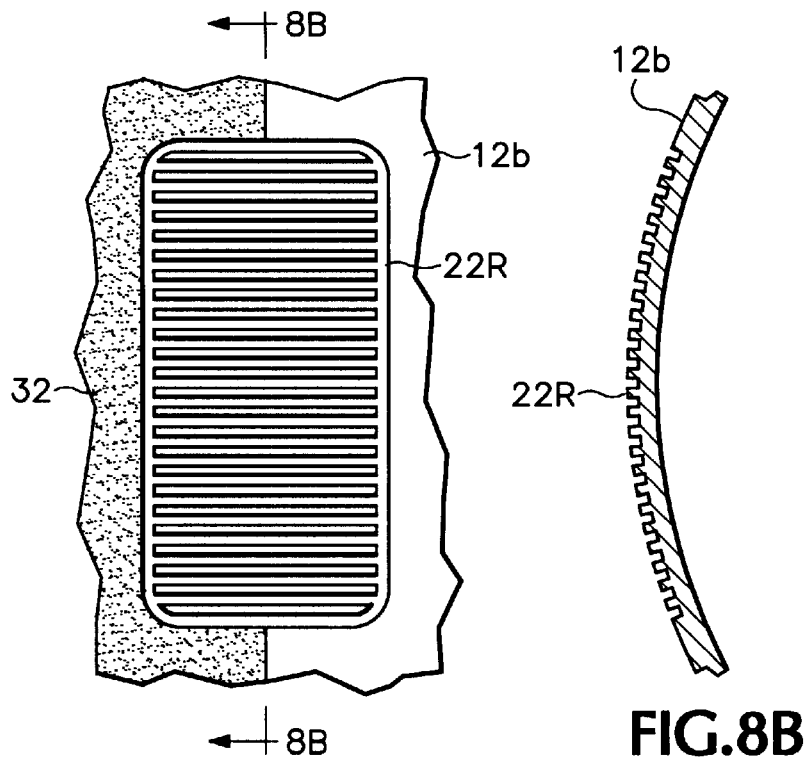
FIG.8A
FIG.8B
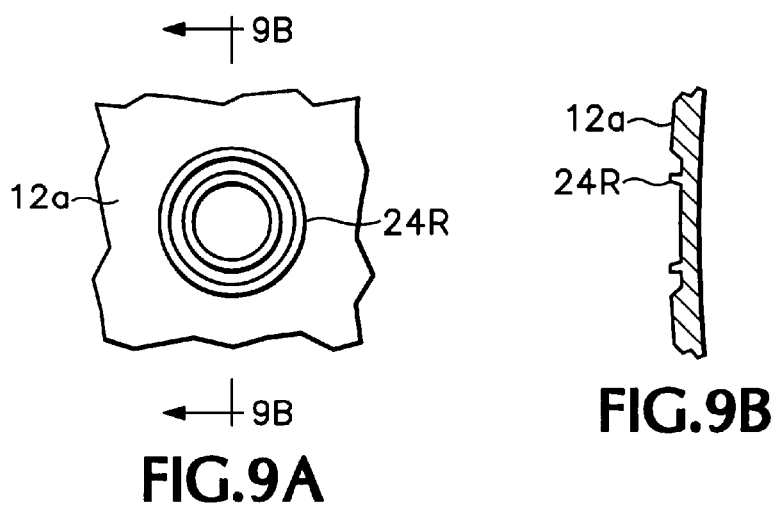
FIG.9A
FIG.9B

TRAINING FOOTBALL

BACKGROUND OF THE INVENTION

1. Field of the Invention

The present invention relates to training equipment for the game of football. The invention concerns, more particularly, a training device that enables an individual to improve football throwing skills.

2. Description of Background Art

Many modern athletic activities utilize an inflatable ball as the primary piece of equipment. Activities such as soccer, basketball, volleyball, and water polo utilize a ball having a generally spherical shape. The game of football, however, utilizes a ball with a unique oblong shape that mathematicians characterize as a prolate spheroid. Accordingly, a football has an enlarged central portion and two end portions, which are located on opposite sides of the central portion and taper to blunt points.

Footballs may be formed from a variety of materials. The footballs utilized by collegiate and professional football organizations, for example, are formed in a traditional manner to include a leather, or pigskin, shell having four panels that are stitched together to form four seams extending from one end portion to the other end portion. Leather laces also extend along one seam through the central portion, and a bladder is located on the interior of the leather shell for enclosing pressurized air. Many modern footballs, however, are formed from a variety of other materials. For example, a football may be formed from an inflatable rubber bladder having indentations that mimic the seams and protrusions that mimic the laces. In addition, modern footballs may be formed from a soft foam material.

In the game of football, a quarterback is endowed with the task of either handing the football to another team member or passing the football to another team member. When passing the football, the quarterback has a relatively short period of time to visually assess the playing field and determine which team member is best positioned to catch the football. While performing the visual assessment of the playing field, the football must be properly positioned in the quarterback's hands to prepare for the throw. A quarterback, therefore, has two primary tasks that must be accomplished simultaneously with different senses: the sense of sight being utilized to select a receiver for the football, and the sense of touch being utilized to properly position the football.

Both of the quarterback's hands are utilized to properly position the football in preparation for a throw. For purposes of this discussion, the hands will be termed a throwing hand and a guide hand. The throwing hand securely grasps the football and releases the football at the proper moment, thereby permitting the football to soar through the air. The guide hand is placed against the football to guide the football, and provide additional security against dropping the football, during initial stages of the throw.

A properly thrown football soars through the air such that one end portion leads and the other end portion trails, with the football generally rotating around a longitudinal axis that extends between the end portions. The position of the throwing hand is critical to ensuring that the football soars through the air in this manner. When properly positioned, the fingers are located on the football in the following manner: First, the thumb is placed near one end of the football and at a location that is separated from the seam that includes the laces by approximately 135 degrees. Second, the index finger crosses and is positioned adjacent to the seam that includes the laces, but at a position that is spaced away from the laces. Third, the middle finger is placed on or near the seam that includes the laces, and adjacent one end of the laces. Fourth, the ring and pinky fingers are placed on the laces, adjacent to the laces, or in a configuration that crosses the laces. In addition to the throwing hand, the position of the guide hand is important. Generally, the palm of the guide hand is located on the central portion of the football and at a location that is separated from the laces by approximately 90 degrees.

The above discussion regarding proper placement of the hands illustrates the complexity associated with proper hand placement. During a football game, the quarterback has a relatively short period of time to properly place the hands upon the football and simultaneously select a receiver. Accordingly, the sense of sight should be dedicated to selecting a receiver, and the sense of touch should be dedicated to positioning the football. Inexperienced quarterbacks, however, may have a tendency to look at the football to assist in proper hand placement. Such actions often detract from the quarterback's ability to select a receiver, thereby limiting the effectiveness of the eventual selection.

Various training aids have been proposed to assist athletes in properly utilizing balls of various types. U.S. Pat. No. 4,546,975 to Nims discloses golf balls and basketballs that have markings to provide the athlete with a means to discern the direction of spin and number of revolutions of the balls. Although such markings may be beneficial in sports like golf and basketball, wherein the athlete may utilize the sense of sight to properly position the ball, such markings would not be beneficial in the game of football where the sense of sight should be entirely reserved for selecting a receiver. U.S. Pat. No. 5,570,882 to Horkan discloses a football having a first part of a hook and pile fastener attached to select portions of the football surface. In addition, a glove is disclosed that include a second part of the hook and pile fastener. The football and glove may be utilized cooperatively to assist an athlete to impart a proper spin to the football. The glove, however, may inhibit the quarterback from utilizing the sense of touch to discern proper hand placement during the limited period of time that is required in the game of football.

SUMMARY OF THE INVENTION

The present invention is a football for training an individual by assisting the individual to tactilely determine locations for proper hand placement, while permitting the visual selection of a receiver. The football includes an outer surface and a plurality of tactile elements located on the outer surface. The tactile elements are tactilely-distinguishable from the outer surface and define locations for placing portions of a throwing hand of the individual upon the football.

Proper hand positioning in preparation for a throw of the football has the capacity to improve the quality of each throw. In general, a spiral throw, wherein the football rotates about a longitudinal axis, is preferred. By positioning the throwing hand properly, the probability of achieving a spiral throw is increased.

The tactile elements may include elements for specifically contacting the thumb, index finger, and middle fingers of the individual. Once these fingers are properly positioned the ring and pinky fingers naturally contact the football proximal the laces. In addition, the tactile elements may include an element for contacting a guide hand of the individual.

The texture of the tactile elements is one characteristic that distinguishes the tactile elements from the outer surface. The tactile elements may also have a color that is different from the remainder of the outer surface to provide a visual indication regarding proper hand placement.

In addition to the tactile elements, the football may include visual elements that provide feedback concerning each throw. The visual elements may be located on end portions of the football such that the individual may see the visual elements following a throw. The visual elements assist the individual in judging rotation, speed, and location of the football. In addition, the visual elements may assist a receiver in catching the football.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 1A is a first perspective view of a training football in accordance with one embodiment of the present invention.

FIG. 1B is a second perspective view of the training football.

FIG. 8A is a plan view of a first tactile element for the training football.

FIG. 8B is a cross-sectional view of the first tactile element, as defined by line 8B–8B in FIG. 8A.

FIG. 9A is a plan view of a second tactile element.

FIG. 9B is a cross-sectional view of the second tactile element, as defined by line 9B—9B in FIG. 9A.

DETAILED DESCRIPTION OF EMBODIMENT OF THE INVENTION

The following discussion and accompanying figures disclose a training football 10 in accordance with the present invention. The primary purpose of football 10 is to provide individuals with a training aid for learning or improving upon football throwing skills. Football 10 may be structured to have characteristics, including shape, size, and weight, that are similar to the characteristics of a conventional football. Accordingly, football 10 may have a relatively small size that is appropriate for children, or football 10 may have a standard size that is suitable for use by collegiate or professional football organizations, for example. By configuring football 10 to have conventional characteristics, the individual may transition to a conventional football following training without having to modify the learned or improved skills to accommodate a conventional football. Once training is complete, therefore, the transition from football 10 to a conventional football is more easily accomplished when football 10 has conventional characteristics. Although football 10 is intended to be utilized as a training aid, the characteristics of football 10 are suitable for use during the game of football.

Figure 2:
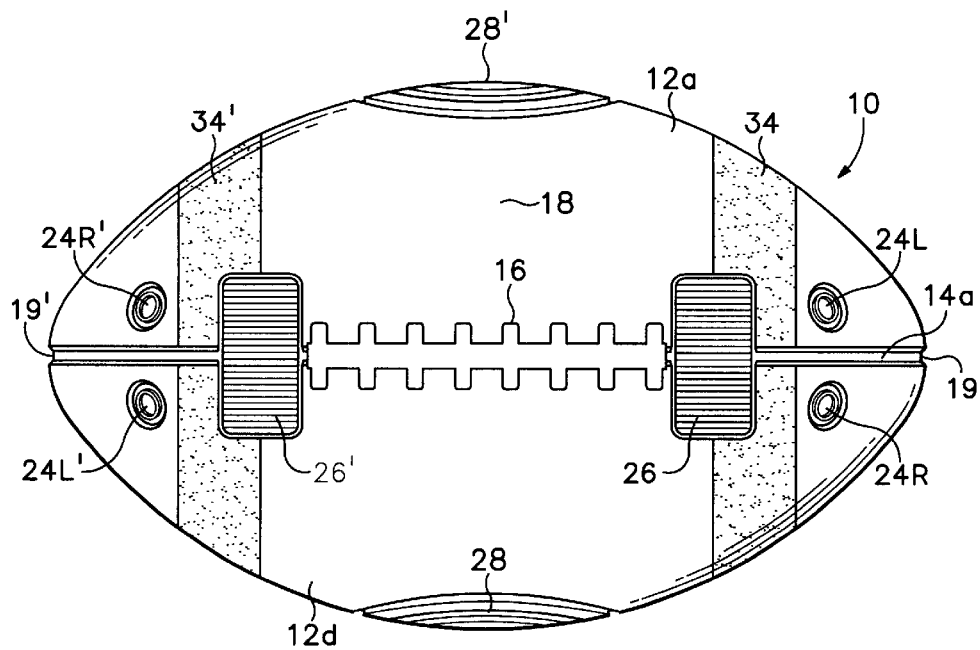
FIG. 2 is a top plan view of the training football.
Figure 3:
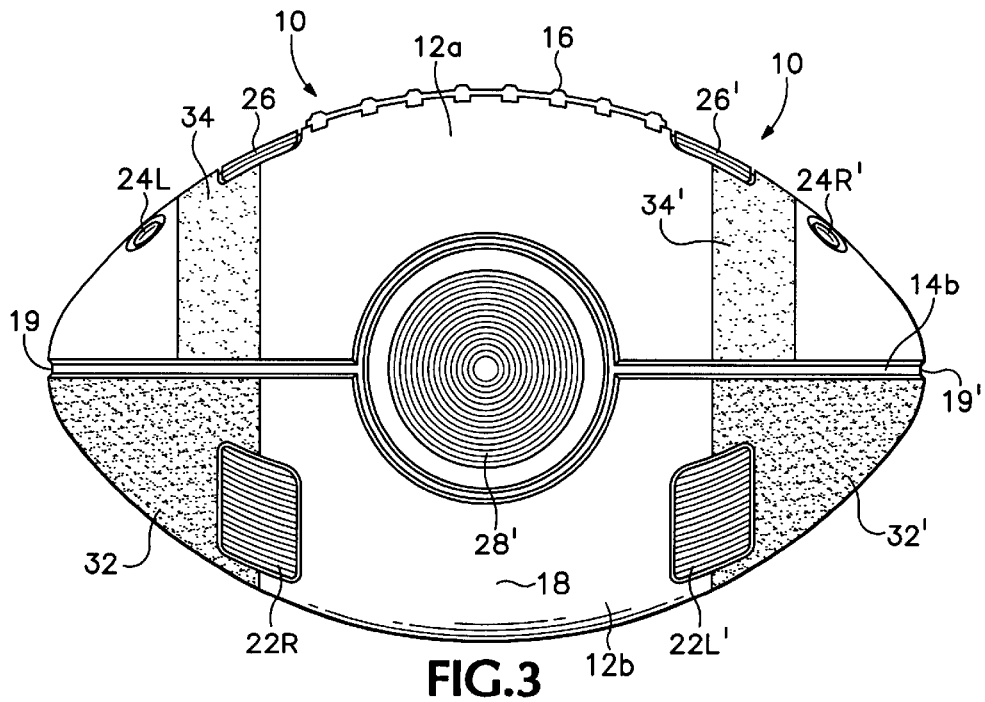
FIG. 3 is a first side elevational view of the training football.
Figure 4:
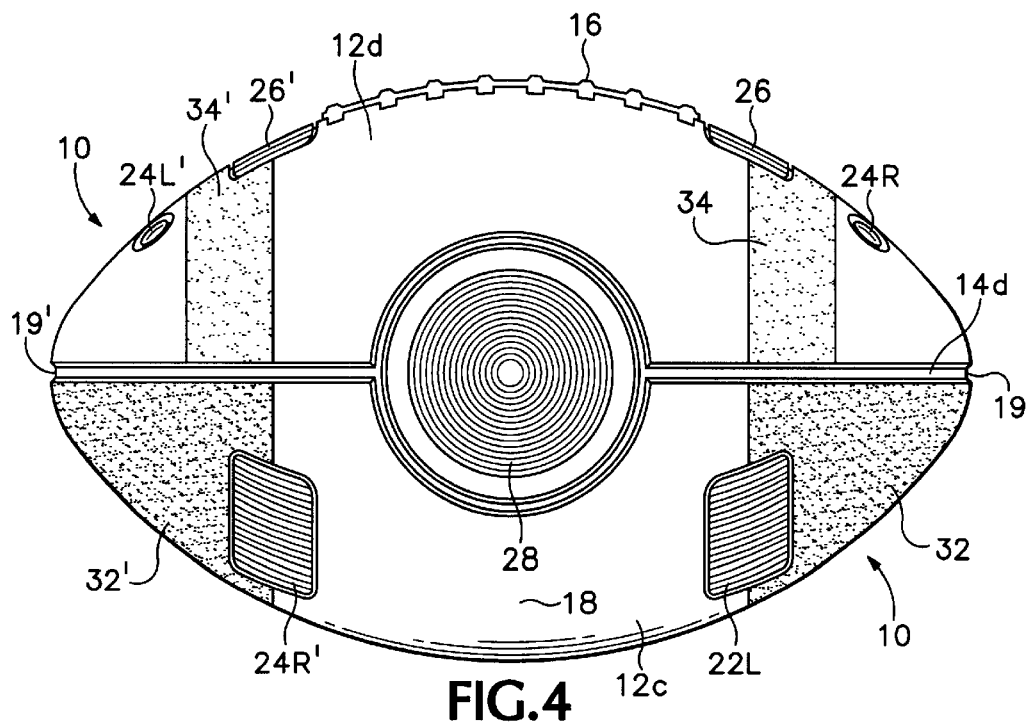
FIG. 4 is a second side elevational view of the training football.
Figure 5:
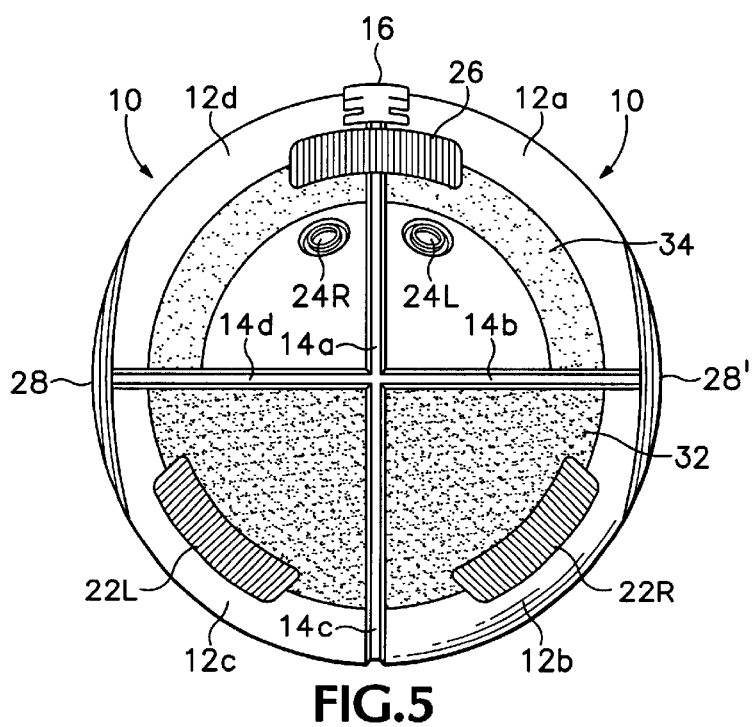
FIG. 5 is a first end elevational view of the training football.
Figure 6:
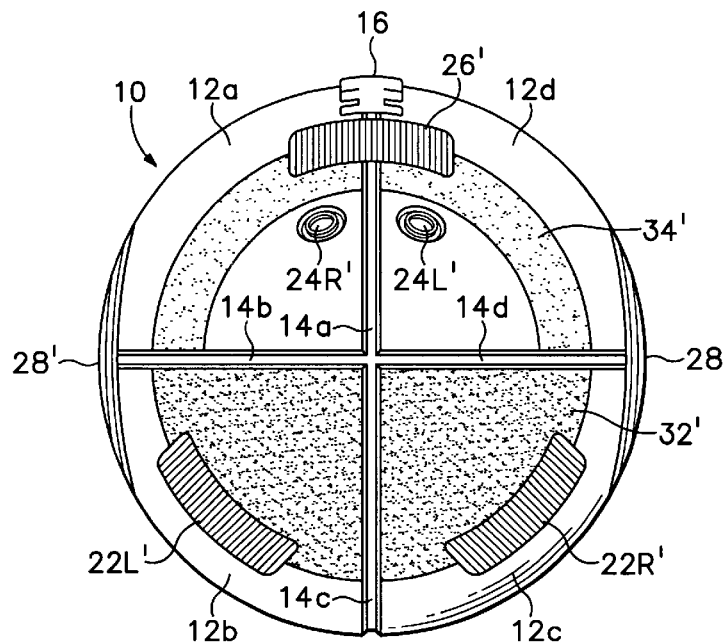
FIG. 6 is a second end elevational view of the training football.
Figure 7:
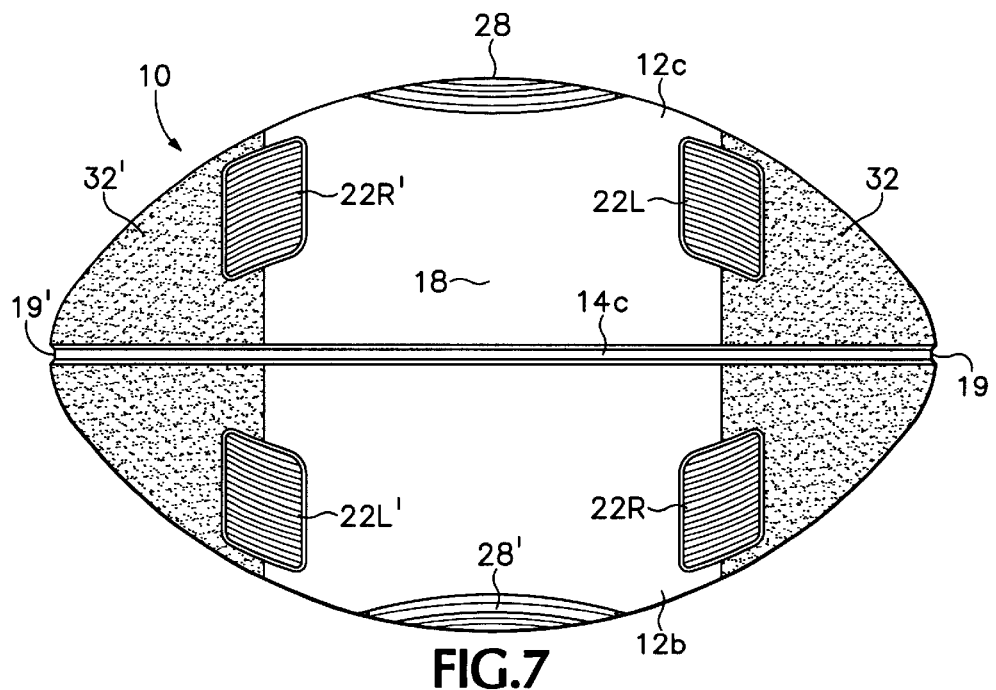
FIG. 7 is a bottom plan view of the training football.

Football 10, as depicted in FIGS. 1–7, includes a shell having four panels 12a–12d that primarily form the exterior surface of football 10; four seams 14a–14d that join panels 12 to each other; and a plurality of laces 16 located along seam 14a. Panels 12 each have a shape that may be generally described as an ellipse with pointed end portions. When joined together by seams 14, panels 12 collectively form a volume with an oblong shape that may be mathematically characterized as a prolate spheroid. Accordingly, panels 12 provide football 10 with an enlarged central portion 18 and two bluntly-pointed end portions 19 and 19' located on opposite sides of central portion 18. Seams 14, which are generally separated by 90 degrees, define the edges of panels 12 and extend from end portion 19 to the opposite end portion 19'.

Panels 12 may be formed from a variety of materials, including leather, natural or synthetic rubber, or foam, for example. When formed from leather, panels 12 may be discrete elements that are sewn together to form seams 14, and laces 16 are strips of leather forming a raised seam. In order to provide an inflatable structure, a polymer bladder may be located within panels 12 to hold pressurized air. When formed of rubber or foam, however, the bladder may be omitted and panels 12 may be formed integral with each other such that seams 14 are ornamental features providing the appearance of a structure formed from leather. Similarly, laces 16 are raised areas on the surface of football 10 that mimic the leather strips utilized in a leather football. As utilized for purposes of the present application, therefore, the terms seams and laces are intended to refer to these structures, whether formed on a leather, rubber, or foam embodiment of football 10.

The structure discussed above generally provides football 10 with the configuration of a conventional football. That is, a conventional football generally has elements that are substantially similar to panels 12, seams 14, and laces 16. In addition to these elements, however, football 10 includes a plurality of perceptive elements, including tactile elements 20 and visual elements 30, that may be perceived by the individual through the senses of touch and sight, respectively. For purposes of the present discussion, the term tactile elements 20 is intended to refer collectively to first tactile elements 22, second tactile elements 24, third tactile elements 26, and fourth tactile elements 28. Similarly, the term visual elements 30 is intended to refer collectively to first visual elements 32 and second visual elements 34. Note that tactile elements 20 may have a visual aspect, as discussed in greater detail below.

The perceptive elements, including tactile elements 20 and visual elements 30, provide the individual with information, assistance, and feedback concerning football throwing skills. With regard to information, tactile elements 20 provide the individual with tactile information relating to proper hand positioning on football 10. In general, tactile elements 20 have a texture that differs from the texture of panels 12, thereby providing the individual with a tactile guide for placing the hands upon football 10. In addition, the surface texture of tactile elements 20 assists the individual with grasping and holding football 10. Concerning feedback, visual elements 30 permit the individual to judge the quality of each throw as football 10 soars through the air. The perceptive elements of football 10, therefore, provides the individual with a comprehensive system for practicing and improving upon throwing skills. Visual elements 30 also assist a receiver in preparing to catch football 10 by providing similar visual information regarding the speed and location of football 10.

During a football game, the individual (a quarterback) has two primary tasks that must be accomplished simultaneously with different senses: the sense of sight being utilized to select a receiver for the football, and the sense of touch being utilized to properly position the football. Tactile elements 20 provide the individual with an enhanced sense of touch regarding the position of football 10 in the individual's hands. This provides the individual with the ability to dedicate the sense of sight to the task of selecting a receiver.

Football 10 may be thrown by either a left-handed or a right-handed individual such that either end portion 19 or end portion 19' leads as football 10 soars through the air. When end portion 19' leads, the individual generally grasps football 10 adjacent to end portion 19. Similarly, when end portion 19 leads, the individual generally grasps football 10 adjacent to end portion 19'. Also, when the throwing hand is the right hand, football 10 is grasped on one side of laces 16, and when the throwing hand is the left hand, football 10 is grasped on the opposite sides of laces 16. Accordingly, proper positioning of the hands upon football 10 depends upon the specific end portion 19 that leads and whether the right hand or the left hand is the throwing hand. Football 10, as depicted in the figures, is configured to include tactile elements 20 that accommodate each of these situations. That is, tactile elements 20 are positioned on football 10 in locations that correspond with the various locations for proper hand placement, whether football 10 is thrown by a right hand or a left hand, and whether end portion 19 or end portion 19' leads as football 10 soars through the air.

Referring to FIG. 1A, proper hand placement will be initially discussed with respect to a right-handed individual. More precisely, an initial discussion of proper hand placement will assume that the right hand is the throwing hand and end portion 19' leads as football 10 soars through the air. A first aspect of proper hand placement relates to the thumb, which should be positioned near end portion 19 and at a location separated from seam 14*a* by approximately 135 degrees. This position corresponds with the location of first tactile element 22R. Accordingly, the thumb of the right hand is properly positioned when contacting tactile element 22R. The index finger should cross seam 14*a* and be positioned adjacent to seam 14*a*, but at a position that is spaced away from laces 16. This position corresponds with the location of second tactile element 24R. Accordingly, the index finger of the right hand is properly positioned when contacting tactile element 24R.

Finally, the middle finger should be positioned on or near seam 14*a*, and adjacent an end of laces 16. This position corresponds with the location of third tactile element 26. Accordingly, the middle finger of the right hand is properly positioned when contacting third tactile element 26.

When the thumb, index, and middle fingers are positioned as discussed above, the ring and pinky fingers of the throwing hand naturally fall on laces 16, adjacent to laces 16, or in a configuration that crosses laces 16. Accordingly, the ring and pinky fingers are properly positioned when located in proximity to laces 16. In addition, proper hand placement is achieved when the palm of the guide hand, which is the left hand for purposes of this initial discussion, is located on an opposite side of football 10 and adjacent seam 14*d*. Accordingly, the guide hand is properly positioned when contacting fourth tactile element 28.

Referring to FIG. 1B, proper hand placement may be discussed under the assumption that the left hand is the throwing hand and end portion 19' leads as football 10 soars through the air. In this scenario, the left hand is positioned on corresponding portions of football 10 such that the thumb contacts first tactile element 22L, the index finger contacts second tactile element 24L, the middle finger contacts third tactile element 26, and the ring and pinky fingers are each located proximal to laces 16. In addition, the guide hand, which is the right hand in this scenario, is properly positioned when in contact with fourth tactile element 28'. Note that first tactile elements 22R and 22L and second tactile elements 24R and 24L are positioned to contact either a right throwing hand or a left throwing hand, but not both. Tactile element 26, however, is utilized by both hands.

Similar hand positions are utilized when end portion 19 leads, rather than end portion 19'. With regard to the right hand being the throwing hand, the thumb will contact first tactile element 22R', the index finger will contact second tactile element 24R', the middle finger will contact third tactile element 26', and the ring and pinky fingers will be positioned proximal laces 16. In addition, the palm of the guide hand will contact fourth tactile element 28'. With regard to the left hand being the throwing hand, the thumb will contact first tactile element 22L', the index finger will contact second tactile element 24L', the middle finger will contact third tactile element 26', and the ring and pinky fingers will be positioned proximal laces 16. In addition, the palm of the guide hand will contact fourth tactile element 28.

Foreseeably, the individuals that will utilize football 10 may have hands, and fingers, of various dimensions. Differences in dimensions will affect that precise locations where the various fingers contact football 10. The dimensions and positions of tactile elements 20 are selected such that the fingers of various individuals will fall upon tactile elements 20, although the fingers may fall upon different portions of tactile elements 20. Tactile elements 22 have a generally rectangular shape and are oriented on football 10 such that a relatively small hand or thumb will contact an end of each tactile element 22, a thumb or hand of intermediate size will contact a central portion of each tactile element 22R, and a thumb or hand having a relatively large size will contact an opposite end of each tactile element 22R. Accordingly, tactile elements 22 are generally dimensioned and positioned to accommodate individuals having hands and fingers of various dimensions. Similar considerations are applicable to tactile elements 26, which have the same general configuration as tactile elements 22. In comparison with tactile elements 22 and 26, tactile elements 24 have a relatively small, circular shape that provides less latitude regarding finger positioning. Proper hand placement upon football 10 may be achieved even with some latitude regarding the positions of the thumb and middle fingers, as evidenced by the dimensions of tactile elements 22 and 26. A more precise placement of the index finger, however, may provide greater consistency when throwing football 10.

Accordingly, the dimensions of tactile elements 24 are more restrictive regarding finger placement than the dimensions of tactile elements 22 and 26.

Figure 10A:
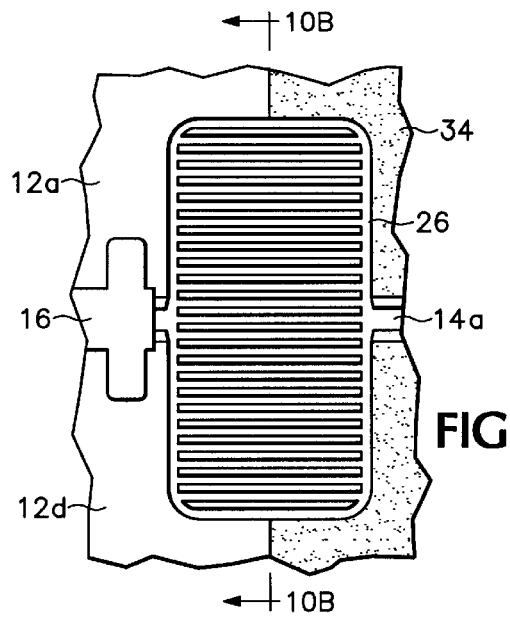
FIG. 10A is a plan view of a third tactile element.
Figure 10B:
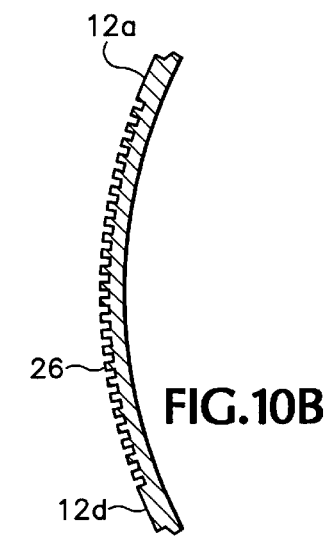
FIG. 10B is a cross-sectional view of the third tactile element, as defined by line 10B—10B in FIG. 10A.
Figure 11A:
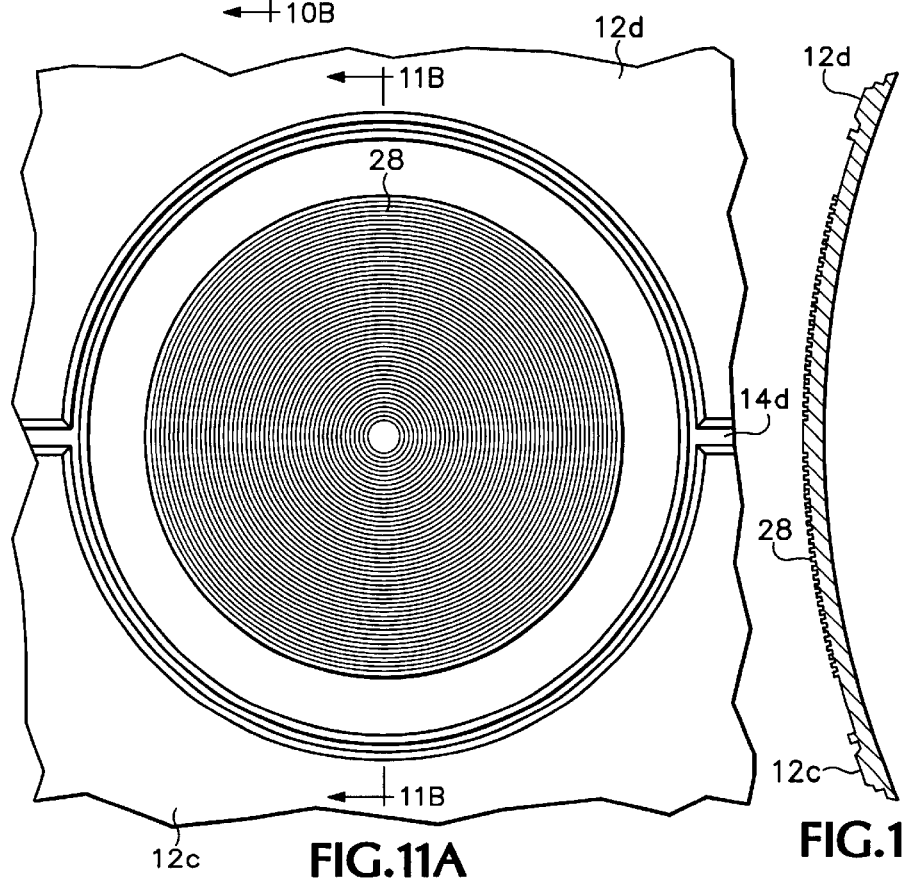
FIG. 11A is a plan view of a fourth tactile element.
Figure 11B:
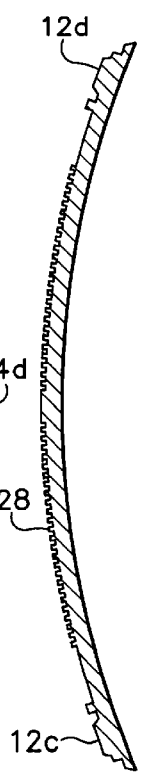
FIG. 11B is a cross-sectional view of the fourth tactile element, as defined by line 11B—11B in FIG. 11A.

The texture of tactile elements 20 differs from the texture of panels 12 to permit the individual to tactilely distinguish between two areas of football 10 without using the sense of sight. Referring to FIGS. 8–11, each type of tactile element 20 is depicted individually. As is evident from the cross-sections, tactile elements 20 include ridges and indentations that will be readily distinguished from the relatively smooth aspects of panels 12. In addition, the textured surface of tactile elements 20 will provide assistance to the individual with grasping and holding football 10.

One advantage from forming football 10 from rubber or foam is the manner in which tactile elements 20 may be integrally-incorporated and recessed into panels 12. That is, tactile elements 20 may be formed integral with panels 12 during portions of the manufacturing process that form panels 12, and tactile elements 20 may be recessed to provide a surface to football 10 that does not include protrusions extending outward from football 10. If football 10 is formed from leather, tactile elements 20 may be separate components of football 10 that are positioned on panels 12, or in indentations formed in panels 12. Alternately, the shapes and positions of tactile elements 20 could be formed directly in the leather material by a process that forms a textured surface, such as branding.

As discussed above, an individual should be able to utilize tactile elements 20 without also utilizing the sense of sight to locate tactile elements 20. Tactile elements 20 may be colored, therefore, to conform to the color of panels 12, thereby providing football 10 with the aesthetic properties of a conventional football. Some individuals, particularly individuals with little experience throwing a football, may benefit from the ability to see the proper hand positions prior to training with football 10. From a psychological perspective, a three-dimensional mental picture of a football that includes the proper locations for hand placement may benefit the individual when attempting to locate tactile elements 20 with only the sense of touch. Accordingly, tactile elements 20 may also have a color that is distinguishable from the color of panels 12.

Based upon the preceding discussion, tactile elements 20 are structured such that an individual may properly place hands upon football 10 without utilizing the sense of sight. During the game of football, or during training exercises, the individual will be able to distinguish the texture of tactile elements 20 from the texture of panels 12 to ensure that the hands are properly positioned. Following repeated use of football 10, the positions of tactile elements 20 will become subconsciously known to the individual and the hands will naturally assume the proper positions, even in the absence of tactile elements 20. Accordingly, the individual may transition to a conventional football following training with football 10.

In addition to tactile elements 20, football 10 includes visual elements 30. Whereas tactile elements 20 are intended to provide the individual information regarding hand placement and assistance with respect to grasping and holding football 10, visual elements 30 are intended to provide the individual with feedback concerning the success of each throw of football 10. In addition, visual elements 30 provide a receiver with information concerning the speed and location of football 10, thereby assisting the receiver with catching football 10.

First visual elements 32 and 32' are located adjacent end portions 19 and 19', respectively, and cover a portion of panels 12b and 12c. When viewed from the trailing end portion 19, as would be viewed by an individual who threw football 10, first visual elements 32 will appear as a spinning portion of football 10. Similarly, second visual elements 34 and 34', which are stripes that are located across panels 12a and 12d of end portions 19 and 19', respectively, will have a similar effect. Depending upon the quality of the throw (e.g., the manner in which football 10 rotates about an axis that extends between end portion 19 and end portion 19'), visual elements 30 will have a different appearance. With regard to a well-thrown football 10, visual elements 30 will rotate in a defined manner around the trailing end portion 19. Visual elements 30 of a poorly-thrown football 10, however, will wobble or otherwise present an unstable appearance. Accordingly, the individual and other individuals who are assisting with the training will be able to utilize visual elements 30 to determine the quality of each throw, thereby providing the individual with feedback during training.

Visual elements 30 may have any color within the scope of the present invention, and may have different colors. In order to provide the individual with a high degree of feedback, however, visual elements 30 should be readily distinguishable from the remaining portions of football 10. That is, the specific colors selected for visual elements 30 should be distinct in comparison with the remainder of panels 12.

Football 10 includes two general types of perceptive elements that assist in training an individual in proper throwing techniques, tactile elements 20 and visual elements 30. In general, therefore, football 10 includes a combination of perceptive elements that may be apparent through the sense of touch and the sense of sight to provide the individual with information concerning proper hand placement, assistance with grasping and holding football 10, and feedback concerning the quality of an individual throw of football 10. Football 10 may be utilized during training exercises to improve upon throwing techniques, and may be utilized during informal games of football due to the unobtrusive nature of the perceptive elements, particularly tactile elements 20 and visual elements 30.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A football for training an individual, said football comprising:
    an outer surface;
    a plurality of discrete tactile elements located on said outer surface, said tactile elements being tactilely-distinguishable from said outer surface, locations of said tactile elements corresponding with positions for placing portions of a throwing hand of the individual upon said football; and
    a guide hand element, separate from laces of said football, for defining a position for placement of a guide hand of the individual upon said football.

2. The football of claim 1, wherein a texture of said tactile elements differs from a texture of said outer surface.

3. The football of claim 1, wherein said tactile elements include:
    a first tactile element situated in a first location that corresponds with a position for placing a first digit of the throwing hand upon said football;
    a second tactile element situated in a second location that corresponds with a position for placing a second digit of the throwing hand upon said football; and a third tactile element situated in a third location that corresponds with a position for placing a third digit of the throwing hand upon said football.

4. The football of claim 3, wherein said laces define a location for placing a fourth digit and a fifth digit of the throwing hand upon said football.

5. The football of claim 4, wherein said third location is adjacent an end of said laces.

6. The football of claim 5, wherein said second location is opposite said laces relative to said third location.

7. The football of claim 5, wherein an angular separation of said laces and said first location is approximately 135 degrees with respect to said outer surface.

8. The football of claim 4, wherein an angular separation of said laces and said guide hand element are approximately 90 degrees with respect to said outer surface.

9. The football of claim 1, further comprising at least one visual element located on said outer surface, said visual element having a color that differs from a color of said outer surface.

10. A football for training an individual, said football comprising an outer surface and a plurality of discrete perceptive elements molded as a one-piece unit with said outer surface, said perceptive elements including:
a first perceptive element situated in a first location that corresponds with a position for placing a first digit of the throwing hand upon said football;
a second perceptive element situated in a second location that corresponds with a position for placing a second digit of the throwing hand upon said football; and
a third perceptive element situated in a third location that corresponds with a position for placing a third digit of the throwing hand upon said football,
said perceptive elements being distinguishable from said outer surface and said football including laces that are situated to correspond with positions for placing a fourth digit and a fifth digit of the throwing hand upon said football.

11. The football of claim 10, wherein a texture of said perceptive elements differs from a texture of said outer surface to tactilely-distinguish said perceptive elements from said outer surface.

12. The football of claim 10, wherein a color of said perceptive elements differs from a color of said outer surface to visually-distinguish said perceptive elements from said outer surface.

13. The football of claim 10, wherein said perceptive elements include a fourth perceptive element for defining proper placement of a guide hand of the individual upon said football.

14. The football of claim 10, wherein said football includes laces.

15. The football of claim 14, wherein said laces define a line that extends along said laces, an angular separation between said first location and said line being approximately 135 degrees.

16. The football of claim 14, wherein said second location is spaced from an end of said laces.

17. The football of claim 14, wherein said third location is adjacent an end of said laces.

18. A football for training an individual, said football comprising an outer surface and a plurality of tactile elements located on said outer surface, said tactile elements being distinguishable from said outer surface, and said tactile elements including:
a first group of said tactile elements located proximal a first end portion of said football, positions of said first set defining a first set of locations for contacting a throwing hand of the individual;
a second group of said tactile elements located proximal a second end portion of said football, positions of said second set defining a second set of locations for contacting the throwing hand of the individual; and
a third group of said tactile elements located on opposite sides of said football to define locations for contacting a guide hand of the individual,
wherein the individual may grasp said football proximate one of said first end portion and said second end portion to contact one of said first group and said second group of said tactile elements.

19. The football of claim 18, wherein each said group includes a first tactile element for contacting a first digit of the throwing hand. a second tactile element for contacting a second digit of the throwing hand, and a third tactile element for contacting a third digit of the throwing hand.

20. The football of claim 19, wherein a texture of said tactile elements differs from a texture of said outer surface.

21. The football of claim 19, wherein a color of said tactile elements differs from a color of said outer surface.

22. The football of claim 19, wherein said football includes laces.

23. The football of claim 22, wherein said laces define a line that extends along said laces, an angular separations between said first tactile element and said line being approximately 135 degrees.

24. The football of claim 22, wherein said second tactile element is spaced from an end of said laces.

25. The football of claim 22, wherein said third tactile element is located adjacent an end of said laces.

26. A football for training an individual, said football comprising an outer surface, laces located on said outer surface, and a plurality of tactile elements located on said outer surface, said perceptive elements including:
a first tactile element situated in a first location that corresponds with a position for placing a first digit of the throwing hand upon said football, said first location being proximal an end portion of said football and having an angular separation from said laces of approximately 135 degrees;
a second tactile element situated in a second location that corresponds with a position for placing a second digit of the throwing hand upon said football, said second location being spaced from an end of said laces; and
a third tactile element situated in a third location that corresponds with a position for placing a third digit of the throwing hand upon said football, said third location being adjacent said end of said laces,
a texture of said tactile elements differing from a texture of said outer surface to tactilely-distinguish said tactile elements from said outer surface, and a color of said tactile elements differing from a color of said outer surface to visually-distinguish said tactile elements from said outer surface.

27. The football of claim 26, wherein said tactile elements include a fourth tactile element for defining proper placement of a guide hand of the individual upon said football.

28. The football of claim 26, further comprising at least one visual element located on said outer surface, said visual element having a color that differs from a color of said outer surface.

29. The football of claim 28, wherein said visual element is located adjacent said end portion of said football.

* * * * *